United States Patent [19]

Namikawa et al.

[11] 4,091,668
[45] May 30, 1978

[54] DIAPHRAGM TYPE GAS METER

[75] Inventors: Kosuke Namikawa, Yokohama; Hajime Onoda, Tokyo; Mineo Okamoto, Kyoto; Isamu Fujii, Nagoya; Takaaki Matsuda, Chita; Mustuo Uebayashi, Okazaki; Hirosi Suzuki, Funabashi, all of Japan

[73] Assignees: Kimmon Manufacturing Co., Ltd., Tokyo; Kabushiki Kaisha Takenaka Seisakusho, Osaka; Aichi Tokei Denki K.K., Nagoya, all of Japan

[21] Appl. No.: 776,732

[22] Filed: Mar. 11, 1977

[51] Int. Cl.² .............................................. G01F 3/20
[52] U.S. Cl. ........................................ 73/263; 73/268; 73/281; 91/1
[58] Field of Search ................. 73/263, 266, 267, 268, 73/281; 91/247, 1, 187, 352; 92/48

[56] References Cited

U.S. PATENT DOCUMENTS

| 620,939 | 3/1899 | Lee | 73/281 |
| 804,465 | 11/1905 | Haas | 73/268 |

FOREIGN PATENT DOCUMENTS

| 867,130 | 6/1941 | France | 73/281 |
| 422,087 | 6/1947 | Italy | 73/263 |
| 725,118 | 3/1955 | United Kingdom | 73/281 |

Primary Examiner—James J. Gill
Attorney, Agent, or Firm—Flynn & Frishauf

[57] ABSTRACT

In a diaphragm type gas meter, one crank plate pivotally mounting a pair of diaphragm movement transmission levers and the other crank plate pivotally mounting a pair of valve actuating levers overlap each other rockably around the central axis of a crank shaft. The relative angular position of the two plates is controlled e.g. by an eccentric cam. On a diaphragm control wall member for restricting the stroke end of the reciprocation of each measuring diaphragm of said gas meter are formed two inclined diaphragm control surfaces with different angles of inclination. Further, on a lower casing of the gas meter is integrally die-cast a partition wall with triangular section flush with the top surface of the lower casing and defining a discharge-side valve chamber and a discharge passage.

13 Claims, 17 Drawing Figures

DIAPHRAGM TYPE GAS METER

This invention relates to diaphragm type gas meter integrating a quantity of the gas delivered through the reciprocation of measuring diaphragms by gas pressure.

Generally, in this type of gas meter, a gas introduced into a valve cage through an inlet port formed on an upper casing is introduced optionally into each measuring chamber formed on a lower casing through a distributing valve mechanism. The gas pressure shifts the measuring diaphragms through a fixed stroke, thereby operating a transmission including rockable blades, blade shafts, and diaphragm movement transmission levers. By such operation, a crank mechanism is operated and a counter integrates and visually indicates the quantity of the gas delivered according to the rotation of a crank shaft. To the crank mechanism is coupled valve members in a distributing valve mechanism through valve actuating levers. The valve members swing through a fixed stroke according to rotation of the crank mechanism, switch optionally introduction of the gas into the measuring diaphragms, and continue the reciprocation of the measuring diaphragms, thereby delivering continuously the gas introduced through the inlet port from the discharge-side valve chamber of the distributing mechanism to an outlet port formed on the upper casing through a discharge passage formed in the lower casing so as to open into said valve chamber, while the quantity of the gas flowed in the meantime is integrated and visually indicated by a counter.

Further, in such a diaphragm type gas meter, there are provided diaphragm control wall means with diaphragm control surfaces along the periphery of the measuring diaphragms for restricting stroke ends to maintain accurate strokes, thereby keeping the measured gas volume per one cycle constant. In order to minimize the error characteristic of the gas meter (hereinafter referred to as "instrument error"), there is so devised that the reciprocation of the valve members is advanced a little ahead of the reciprocation of the measuring diaphragms in phase, thereby completing valve switching operation before the measuring diaphragms reach their respective stroke ends. That is, each valve actuating lever is usually installed in an angular position advanced through some angular distance or the so-called "angle of advance". The fact, however, is that the proper value of such angle of advance may not be fixed varying with the manufacturing accuracy of measuring diaphragms and the assembling accuracy of any other parts as well as the types of gas meters. Accordingly, there has been a demand for gas meters with such construction that the individual angles of advance may be adjusted readily and securely for the respective gas meters after assembling them.

Furthermore, the measuring diaphragms are usually made of rubber or other flexible materials, so that they may be subject to rumples due to swelling. If there are such rumples on each measuring diaphragm, the surface of the diaphragm will be currugated to prevent the measuring diaphragm from coming into close contact with the diaphragm control surface at the stroke end. Thus the measured volume may be subject to error. Such has been forming a cause of the instrument error of a gas meter. Therefore, there have been required diaphragm gas meters which may minimize the variation of the measured volume even though the measuring diaphragms are rumpled by swelling.

Each rockable blade is fixed to a blade shaft extending vertically from the measuring chamber to the above valve cage. The lower end portion of the blade shaft is supported by a thrust bearing, though it should be so devised as to be prevented from coming off the bearing during operation. In order to prevent the blade shaft from coming off the bearing, there has conventionally been used an E-shaped washer or a retaining ring attached to the middle of the blade shaft so that the washer or ring will hit against the frame of the gas meter or a cylindrical member fixed to such frame and put on the blade shaft if the blade shaft is forced upward, thereby preventing the blade shaft from coming off the bearing. However, it has been troublesome to attach such washer or ring to the blade shaft, reducing the operation efficiency. Meanwhile, if the washer or ring is applied with an intense force, it may be removed from the attached position, rendering the retaining capability insecure. Therefore, there have been requested diaphragm type gas meters provided with preventive means against coming off of the blade shaft requiring few components and easy to assemble.

There have recently been increasing cases where the upper and lower casings of the gas meter are formed by die-casting. This is because the essential parts of the gas meter including valve cage, measuring chambers, and valve chambers as well as inlet port and outlet port may be formed integrally by such die casting, which will not only improve the operation efficiency but reduce the overall size of the gas meter. The difficulty of such die casting, however, lies in forming the partition wall between the discharge-side valve chamber and the discharge passage opening thereto integrally on the lower casing. The partition wall is required to be formed flush with the top surface of the upper casing in order to communicate the discharge passage with the outlet port and maintain the airtightness of the valve chamber. In the prior art gas meters, only the partition has been formed separately and attached fixedly to the lower casing after forming thereof, or a core has been employed at die casting and removed from the lower casing after completion of forming. In either method, however, the operation efficiency in forming, as well as the quality of products, has been rather poor. Accordingly, there has been a demand for die-cast diaphragm type gas meters of high quality with the partition wall formed integrally on the lower casing without difficulty.

An object of this invention is to provide a diaphragm type gas meter capable of eliminating the above-mentioned conventional blemishes, fulfilling the aforesaid various requirements, and securing simple construction, low production cost and ease of assembly as well as easy and correct adjustment, reliable operation and high-accuracy measurement.

DETAILED DESCRIPTION

The illustrated diaphragm type gas meter includes die-cast upper and lower casings 15 and 16. The upper casing 15 and the lower casing 16 are screwed airtight to each other through a sealing member 17. In the upper casing 15 is defined a valve cage 18, into which an inlet port 19 formed integrally on the upper casing 15 opens. Also on the upper casing 15 is integrally formed a gas outlet port 20. In the front portion of the upper casing 15 is contained a counter 21 as indicated by the broken line. The counter 21, which is to operate according to rotation of a crank mechanism as mentioned hereinafter and integrate and display the quantity of the gas flowed, may be of a conventional construction. Numeral 21a indicates a shaft for movement transmission between the counter 21 and the crank mechanism.

Figure 5:
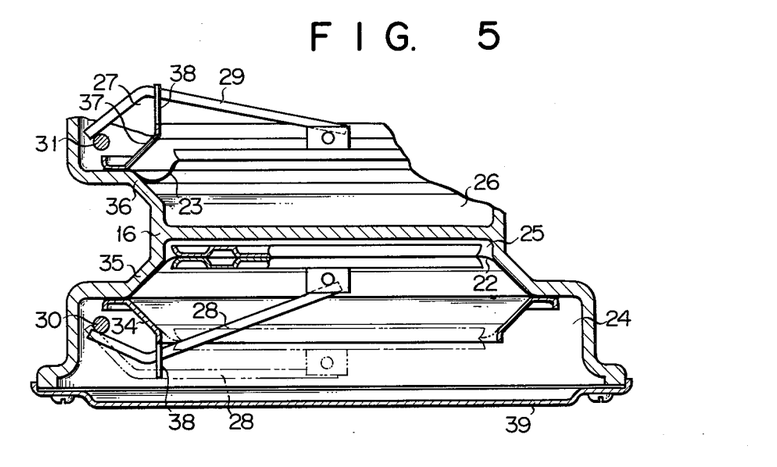
FIG. 5 is a partial sectional view along line 5—5 of FIG. 4 illustrative of the construction of the diaphragm control wall means.

The lower casing 16 is provided with a pair of discoid measuring diaphragms 22 and 23, which divide the interior of the lower casing into four measuring chambers 24, 25, 26 and 27 as shown in FIG. 5. The pair of measuring diaphragms 22 and 23 are made of rubber or other flexible material. The pair of measuring diaphragms 22 and 23 are fitted with free ends of rockable blades 28 and 29 respectively, while the fixed ends of the rockable blades are fixed to the middle portions of blade shafts 30 and 31 located vertically. The lower ends of the blade shafts 30 and 31 are rotatably born by thrust bearings 32 formed integrally on the lower casing 16. The upper ends of the blade shafts are protruding from the measuring chambers into the valve chamber 18 in the upper casing 15 through bushes 33. The blade shafts and the rockable blades may be composed of integrally formed members. The pair of measuring diaphragms 22 and 23 is reciprocated at fixed strokes by the gas pressure when gas is optionally introduced into the measuring chambers. Accompanying such reciprocation, the rockable blades 28 and 29 also reciprocate through fixed angular ranges, thereby rotating the blade shafts 30 and 31 through fixed angular ranges. In order to restrict the stroke end of the reciprocation of the measuring diaphragms 22 and 23, there are provided circular diaphragm control means 34, 35, 36 and 37 on both sides of the respective measuring diaphragms along the periphery thereof. Each diaphragm control means has differently inclined control surfaces 34a and 34b, while the construction of such control surfaces will be described in detail hereinafter with reference to FIG. 6. The diaphragm control means 35 and 36 are formed integrally on the lower casing 16, while the diaphragm control means 34 and 37 are made of metal plates. The diaphragm control plates 34 and 37 are screwed to the lower casing 16 in layers with the peripheral portions of the measuring diaphragms 22 and 23. At the edges of the diaphragm control plates 34 and 37 are protruding mooring strips 38 formed integrally thereon. As regards one diaphragm control plate 34, the mooring strip 38 is located above the rockable blade 28, leaving a narrow gap between the strip 38 and the upper edge of the rockable blade 28. The protruding direction of the mooring strip 38 runs parallel with the rocking direction of the rockable blade 28. As shown in FIG. 5, the mooring strip 38 is long enough to cover the rocking range of the rockable blade 28. Therefore, such mooring strip 38 will hit against the upper edge of the rockable blade 28 if the blade shaft 30 is forced upward or in such a direction as to come off the bearing 32 during operation, thereby restraining the blade shaft 30 from shifting vertically. Thus, the blade shaft 20 would never come off the bearing 32, requiring no washer or ring for prevention of such coming off. This also applies to the other diaphragm control plate 37; the mooring strip 38 prevents the blade shaft 31 from coming off the bearing 32. Since connecting rod members are attached to the upper end portions of the pair of blade shafts 30 and 31 respectively as described below, depending upon the correlation between both connecting rod members, only one mooring strip may be used concurrently for both blade shafts, eliminating the other mooring strip of the diaphragm control plate.

Further, on both sides of the lower casing 16 are screwed side plates 39 respectively to keep the measuring chambers 24 and 27 airtight.

Figure 1:
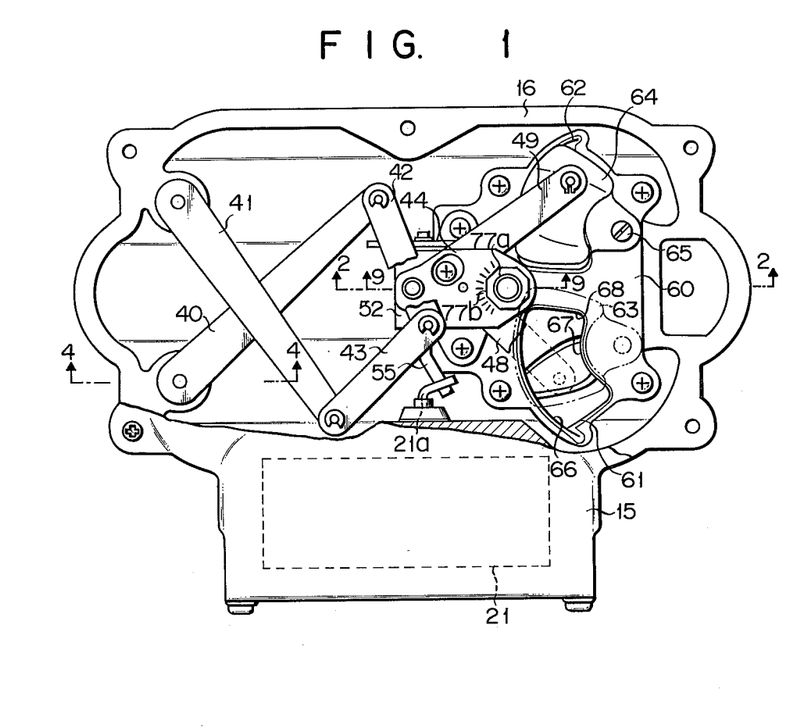
FIG. 1 is a top view of the diaphragm type gas meter according to the invention with the upper casing partially broken.

To the upper end portions of the blade shafts 30 and 31 are fixed mooring ends of diaphragm movement transmission levers 40 and 41. Said levers intersect each other on parallel horizontal planes, and each of their free ends are pivotally attached to one end of each of another pair of diaphragm movement transmission levers 42 and 43. The other ends of the diaphragm movement transmission levers 42 and 43 are both pivotally attached to a pin 45 fixed to a first crank plate 44. The first plate 44 is laid on top of a second plate 46. On the second plate is fixed a pin 47, which mounts pivotally one end of each of valve actuating levers 48 and 49. The free end of a crank lever 50 is pivotally attached to the bottom end of the pin 47. The crank lever is fixed to the upper end portion of a crank shaft 51. The crank shaft 51 is rotatably supported in a vertical position by a gear box 52. A worm fixed to the crank shaft 51 is engaged with a worm wheel 54, which is fixed to a transmission shaft 55. The transmission shaft 55 is engaged with a transmission shaft 21a of said counter 21 as shown in FIG. 1. The above-mentioned first and second plates 44 and 46, crank lever 50, worm 53, worm wheel 54, and transmission shaft 55 form a crank mechanism. The construction of the first and second crank plates 44 and 46 will be described in detail hereinafter.

Figure 2:
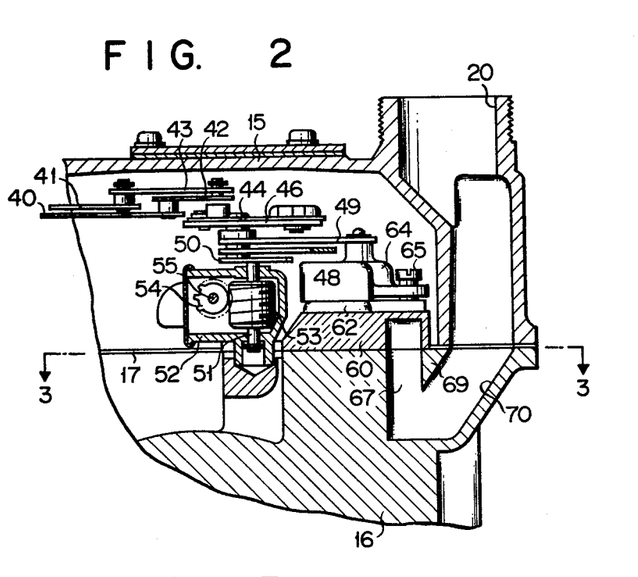
FIG. 2 is a partial sectional view as taken along line 2—2 of FIG. 1.
Figure 3:
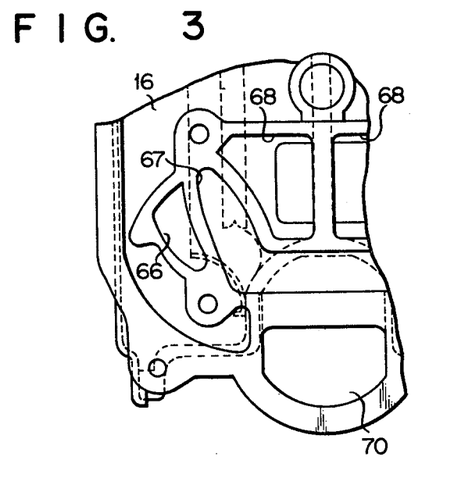
FIG. 3 is a partial sectional view taken along line 3—3 of FIG. 2 illustrative of the construction of the distributing valve.
Figure 4:
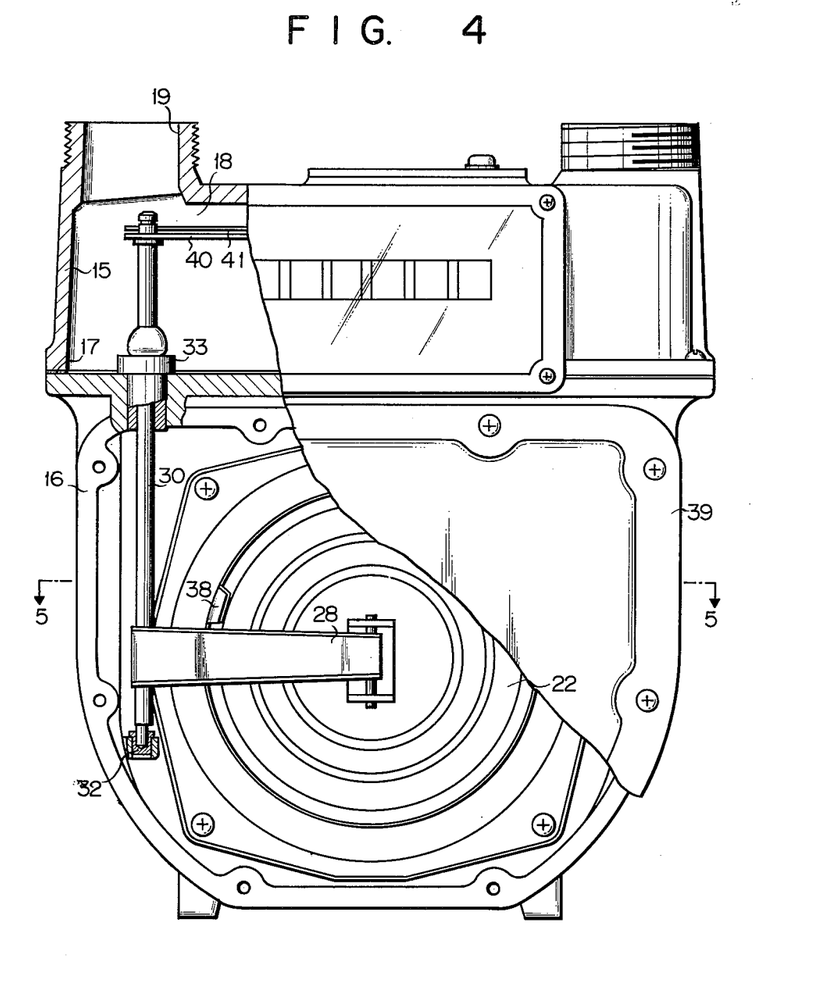
FIG. 4 is a partial broken front view as taken along line 4—4 of FIG. 1 illustrative of the construction of the blade shaft portion.

On the top surface of the lower casing 16 is screwed a valve seat member 60. The valve seat member 60 is provided with a pair of valve seats 61 and 62, on which valve members 63 and 64 are swingably mounted respectively. The valve seat member and valve members may be made of either metallic or plastic material. On the valve seat member 60 is screwed the gear box 52. The pair of valve members 63 and 64 are fitted with the other ends of the valve actuating levers 48 and 49 respectively. Thus, the valve members 63 and 64 reciprocate over a fixed angular range through the valve actuating levers respectively according to the rotation of the crank mechanism, and swing around a guide screw 65 on the valve seats 61 and 63. The two valve members 63 and 64 swing with the phase difference at an angle of 90°. Below the valve seat 61 are located three valve chambers 66, 67 and 68 formed integrally on the lower casing 16. Similarly to this, below the other valve seat 62 are formed also three valve chambers (without numbers). As shown in FIG. 3, the valve chamber 66 opens into one lower measuring chamber 24. The valve chamber 68 opens into the other lower measuring chamber 25. The central or discharge-side valve chamber 67, as shown in FIG. 2, opens into a discharge passage 70 defined by said chamber 67 and a partition wall 69, the discharge passage 70 opening into the outlet port 20 of the upper casing 15. Thus, the valve seat member, valve seats, valve members, and valve chambers form a pair of distributing valve mechanism. However, the construction itself of such distributing valve mechanism is well-known in the field.

The aforesaid distributing valve mechanism and the crank mechanism are contained in the valve cage 18 in the upper casing 15. The valve members 63 and 64 in the distributing valve mechanism, the valve actuating levers 48 and 49, and the first and second crank plates 44 and 46 all swing or rock in horizontal planes.

In the diaphragm type gas meter outlined hereinbefore, a gas to be measured is introduced into the valve cage 18 through the inlet port 19. The gas enters any valve chamber into which the valve members 63 and 64 are opening. Since the central discharge-side valve chamber 67 is always cut off from the valve cage 18 by the valve members, however, the gas will not first enter said valve chamber 67. The gas in the valve chamber enters a measuring chamber communicating with said chamber to move the measuring diaphragms 22 and 23. This movement is transmitted to the crank mechanism through a movement transmission mechanism composed of the rockable blades, blade shafts, and diaphragm movement transmission levers, thereby starting rotation of the crank mechanism. Such rotation actuates the counter 21 through the transmission shaft 55 on the one hand, while it causes the valve members 63 and 64 of the distributing valve mechanism to swing through the valve actuating levers 48 and 49 on the other. By such swing of the valve members, the so-called switch of valve is made, introducing the gas within the valve cage 18 into another valve chamber to move the measuring diaphragm 22 and 23 in the opposite direction. The gas, initially permitting the measuring chamber, is returned to the valve chamber, where it is sent to the discharge-side valve member through a recess (not shown) formed on the seat surface of the valve members and then delivered to the outlet port 20 through the discharge passage 70. Meanwhile, the quantity of the gas delivered is integrated and indicated by the counter 21.

The reciprocation of the measuring diaphragms 22 and 23 and the reciprocation of the valve members 63 and 64 have such relation to each other that the latter advances a little ahead of the former in phase. That is, the valve members are so designed that the valve switching action is completed before the measuring diaphragms reach their respective stroke ends. In the illustrated diaphragm type gas meter according to the present invention, the crank mechanism is provided with the aforementioned first and second crank plates 44 and 46. On one plate 44 is formed a punched hole 71 by pressing, while on the other plate 46 is formed a projection 72 formed by pressing. The projection 72 is fitted in the punched hole 71 so that the both plates 44 and 46 may rock relatively to each other with the fitting point of the hole 71 and projection 72 as the rocking center. That is, the hole 71 and the projection 72 form a supporting means for supporting the both plates 44 and 46 in the rocking center position. The rocking center position of the two plates is brought in line with the center axis X-X of the crank shaft 51 by means of the pin 47 and the crank lever 50. Accordingly, the both plates 44 and 46 are to rotate together with the crank shaft around the rocking center.

The two plates 44 and 46 are usually fixed to each other for unified rotation by a fixing means including a slot 73 formed on one plate 44, a bolt 74 supported by the other plate engagedly with said groove, and said spring washer 75. However, the both plates are fixed by a frictional force, and may rock relatively with each other if a turning force surpassing such frictional force is applied thereto. The slot 73 is formed substantially arcutate around the rocking center.

A means for controlling the relative angle of the two plates 44 and 46 is basically provided with an eccentric cam 76, a rotating member 77 for supporting said cam, and a cam slot 78 engaged with the eccentric cam. The rotating member 77 is rotatably supported by the first plate 44 and has an octagonal operating dial portion 77a formed integrally thereon. On the dial portion 77a is formed a pointer 71b. In the vicinity of the periphery of the dial portion 77a on the first plate 44 is marked a dial 79 used for checking the volume of rotary operation of the dial portion 77a together with the pointer 77b. The eccentric cam 76 is bolt-shaped and supported in an eccentric position by the rotating member 77. The eccentric cam 76 may be formed integrally on the rotating member 77. The cam slot 78 engaged with the eccentric cam 76 is formed in a slot shape on the second plate 46, the longitudinal direction of said slot being substantially coincident with the radial direction as compared with the rocking center. Between the periphery of the eccentric cam 76 and the rotating member 77 is interposed a spring washer 80. In the relative angle control means with such construction, when the operating dial portion 77a is turned, the eccentric cam 76 swings and the cam slot 78 moves accompanying the cam, so that the second plate 46 rocks relatively to the first plate 44 around the rocking center. The rocking distance may be confirmed through the scale 79 and the pointer 77b. Thus, the relative rocking of the two plates may vary an angle R formed by the pivotal pin 45 of the diaphragm movement transmission levers on the first plate 44 and the pivotal pin 47 of the valve actuating levers on the second plate 46 with the rocking center as the center, thereby controlling the angle of advance. On the first plate 44 is formed a slot 81 at a portion corresponding to the pin 47. The angle R is set at a predetermined standard design value at time of assembling the gas meter, though it may be subject to unevenness due to mechanical errors of the parts and, in practice, may not usually secure the desired angle of advance. Therefore, the angle of advance requires control after assembly. In the gas meter of this invention, such control may be performed quite easily in such a manner as described above.

Figure 6:
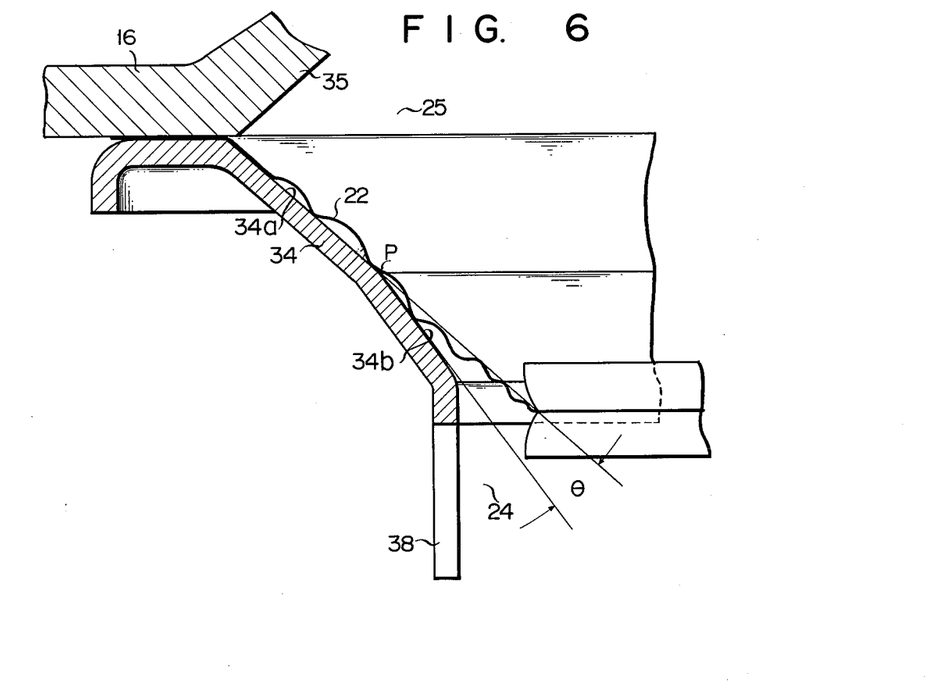
FIG. 6 is an enlarged view of the principal part of FIG. 5 for illustrating the construction of the diaphragm control wall means in detail.

Referring now to FIG. 6, there is illustrated a definite construction of the diaphragm control wall means. In the diaphragm control wall means 34 of the gas meter according to this invention, the first circular inclined diaphragm control surface 34a and the second circular diaphragm control surface 34b extending adjacent thereto are bent at a bent point P as a border so as to form an angle of θ therebetween. The measuring diaphragm 22, when reached the stroke end, is brought in extensive contact with the first diaphragm control surface 34a. Owing to the effect of diaphragm swelling, however, there are caused rumples on the measuring diaphragm 22. Meanwhile, if the overall area of the diaphragm fails to come in full contact with the first diaphragm control surface 34a, the measured capacity will be reduced. Nevertheless, in the gas meter of the invention, the second diaphragm control srface 34b opens slightly outward as compared with the first control surface 34a, so that a portion of the measuring diaphragm 22 corresponding to such surface 34b may be allowed additionally to swell outward by the gas pressure. Since such additional swelling will increase the measured capacity, such increase and said reduction of the measured capacity due to the rumples on the diaphragm will offset each other, thereby providing a correct measured capacity. The swelling degree of the diaphragm portion may be determined by the bending degree of the second diaphragm control surface 34b as compared with the first surface 34a. Accordingly, the angle of bending θ is to be determined at time of designing, considering the degree of rumpling caused on the diaphragm.

Further, the first and second diaphragm control surface 34a and 34b may be either flat or slightly curved. The above description also applies to the construction of the diaphragm control surfaces in other diaphragm control wall means 35, 36 and 37.

Figures 7, 8:
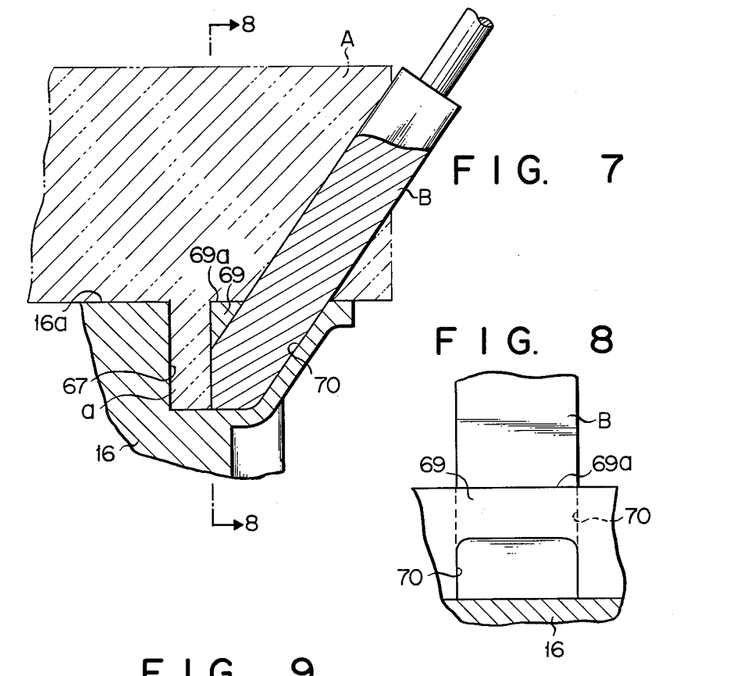
FIG. 7 is an enlarged view illustrative of the process for die-casting the partition wall integrally on the lower casing.
FIG. 8 is a partial sectional view as taken along line 8—8 of FIG. 7.
Figure 9:
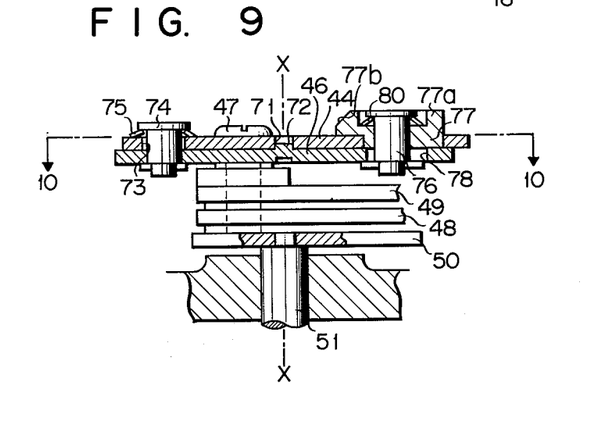
FIG. 9 is an enlarged sectional view as taken along line 9—9 of FIG. 1 for illustrating the construction of the crank mechanism in detail.
Figure 10:
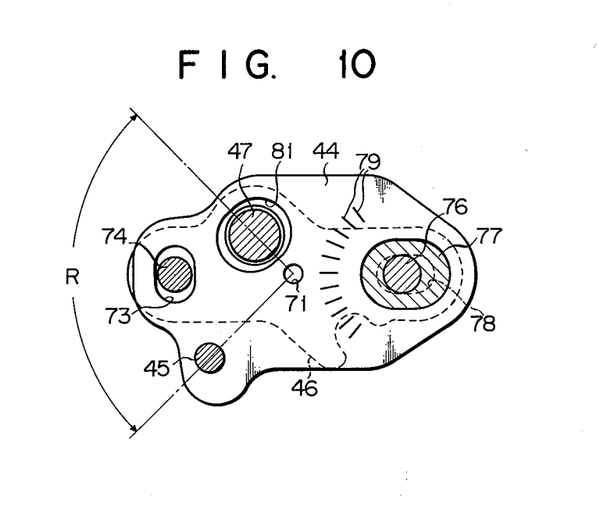
FIG. 10 is a sectional view as taken along line 10—10 of FIG. 9.

Referring now to FIGS. 7 and 8, there is definitely illustrated a process of die-casting the partition wall 69 for defining the discharge-side valve chamber 67 and the discharge passage 70 integrally on the lower casing 16. The top surface 16a and the valve member 67 are formed by means of an upper die A as indicated by the chain lines. The upper die A is provided with a leg portion a corresponding to the valve chamber 67. The lower die is not shown. In order to form a discharge passage 70 opening into the valve chamber 67, a core member B is inserted into the upper die A in an inclined position until said core member is brought into contact with the side face of the vertical leg portion a. The core member B is set at the forming position after the upper die A is set in situ. Further there may be employed a driving means of a piston-cylinder type for forwarding the core member B to the forming position, though it is not shown in the figures.

Thus, in the die-casting method as described above, there may be formed the partition wall 69 integrally on the lower casing 16, the partition wall having a triangular section and a top surface 69a flush with the top surface 16a of the lower casing 16. Accordingly, the forming operation is facilitated substantially by use of such forming process.

In FIGS. 11 to 17, there are shown four examples of modification of the crank mechanism portion provided with a means for controlling the angle of advance different from the above-mentioned embodiment in construction. We will now describe such modified examples successively with the parts in common with the first embodiment designated by the identical numeral.

Figure 11:
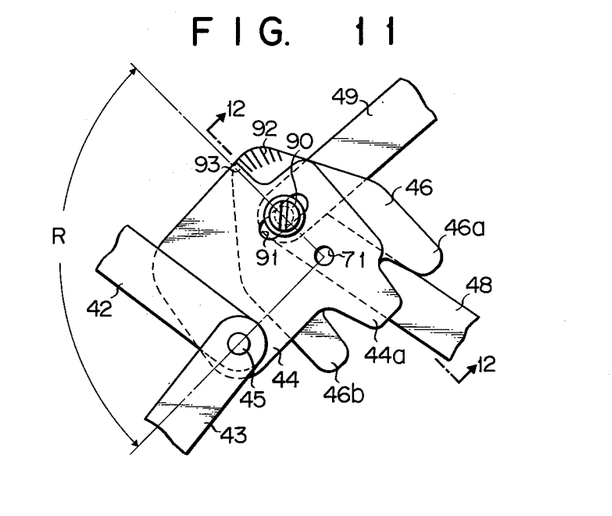
FIG. 11 is an enlarged plan of the crank mechanism portion illustrative of a modified example of the crank mechanism.
Figure 12:
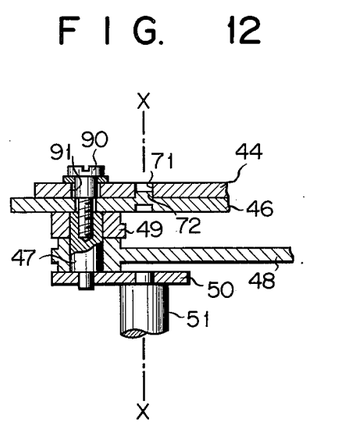
FIG. 12 is a partial sectional view as taken along line 12—12 of FIG. 11.

In a modified example as illustrated in FIGS. 11 and 12, similarly to the first embodiment of the invention, the rocking center of the two crank plates 44 and 46 is determined by the fit of the projection in the punched hole 71. The upper end portion of the pin 47 pivotally mounting the valve actuating levers 48 and 49 is formed smaller in diameter, and fitted in the second plate 46. Further, the pin 47 has a tapped hole formed downward from the smaller-diameter shaft portion in the axial direction. A step bolt 90 is screwed into the tapped hole until it hits against the end face of the smaller-diameter shaft portion. On the first plate 44 is formed a slot 91 in which the larger-diameter shaft portion of the step bolt 90 is fitted. Said slot 91 is formed arcuate around the rocking center X—X. Therefore, when the bolt 90 is loosened, the first plate 44 is to rock relatively to the second plate 46 within a range defined by the slot 91. Meanwhile, when the bolt 90 is tightened securely, the both plates 44 and 46 may be fixed in a desired relative position. That is, the bolt 90 forms a fixing means for the two plates 44 and 46.

On the edge of the first plate 44 is integrally formed a single lug 44a, while on the edge of the second plate 46 are integrally formed lugs 46a and 46b so as to sandwich the lug 44a from the both sides thereof respectively. In changing the relative angular position of the two plates 44 and 46, it may be accomplished by thrusting and wrenching a screwdriver or the like tool in between the lug 44a and the lug 46a or 46b. Naturally, in doing this, the bolt 90 should be loosened previously. By using such a simple tool, the relative angular position of the two plates 44 and 46 may be changed; the angle R formed by the pins 47 and 45 about the rocking center.

A scale 92 is marked on the surface of the second plate 46 along the vicinity of the edge thereof, while the edge of the first plate 44 is provided with a pointer 93 formed by notching said edge. Thus, the variation of the relative angle between the two plates 44 and 46 may be checked through the scale 92 and the pointer 93.

Figure 13:
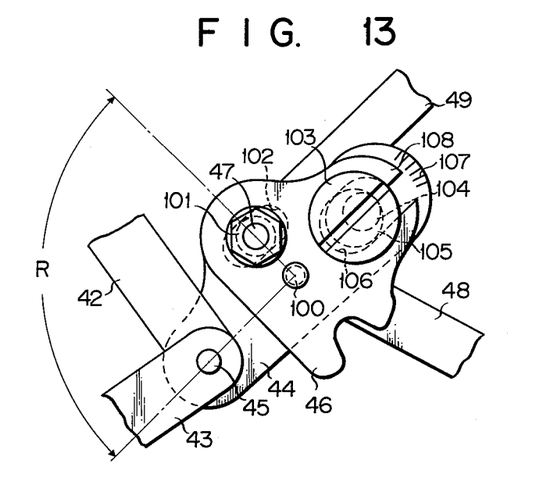
FIGS. 13 and 14 are enlarged plans of the crank mechanism portions illustrative of further modified examples of the crank mechanism.

In another modified example as illustrated in FIG. 13, the first plate 44 underlies the second plate 46. The both plates 44 and 46 are relatively rockably supported by a rivet 100, which is deemed to be on the rocking center. The pair of valve actuating levers 48 and 49 are pivotally attached to the threaded pin 47, which is fixed to the second plate 46 by means of a nut 101. The pin 47 is engaged with a slot 102 formed on the first plate 44. The slot 102 is formed arcuate around the rocking center. The two plates 44 and 46 are allowed to rock relatively to each other within a range defined by the slot 102.

The means for controlling the relative angle of the both plates has a construction similar to that of the first embodiment. In this modification, however, a dial portion 103, a rotating member 104, and an eccentric cam 105 are formed integrally in such an appearance as a step bolt. Further, the step-bolt-like member holds the both plates 44 and 46 by a frictional force employing a spring washer (not shown). However, if a screwdriver is turned engagedly with the screwdriver grooved on the dial portion 103, the rotating member 104 and the eccentric cam may be rocked against the frictional force. Since the eccentric cam 105 is engaged with a cam slot 106 with one open end formed on the second plate 46, the cam slot 106 moves according to the rocking motion of the eccentric cam 105. Thus the relative rocking angle of the both plates 44 and 46 may be varied; the angle R formed by the pin 47 and the pin 45 about the rocking center is varied. On the surface of the first plate 44 is marked a scale 107 along the edge thereof, while a pointer 108 is formed on the second plate 46 at the open edge of the cam slot 106 correspondingly to the scale 107. The variation of the relative rocking angle of the both plates 44 and 46 may be checked through these scale 107 and pointer 108.

Figure 14:
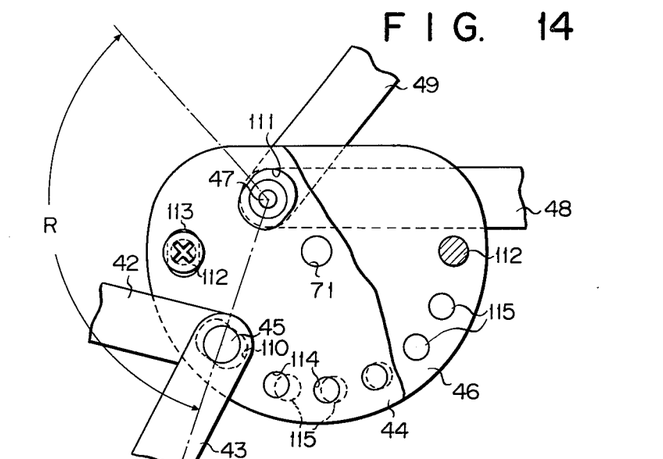

In an additional modified example as illustrated in FIG. 14, the first plate 44 is underlaid by the second plate 46 with the same configuration. The rocking center of the two plates is determined by the fit of the projection in the punched hole in the same manner as the first embodiment. A slot 110 is formed on a portion of the second plate 46 corresponding to the pin 45 fixed to the first plate 44 for pivotally mounting the diaphragm movement transmission levers. Meanwhile, a slot 111 is formed on a portion of the first plate 44 corresponding to the pin 47 for the valve actuating levers. Similarly to the construction as illustrated with reference to the first embodiment, bolts 112, slots 113, and spring washer (not shown) are located in two positions respectively as means for holding the two plates 44 and 46 fixedly. The first and second plates 44 and 46 are provided with a plurality of punched holes 114 and 115 respectively. These holes are arranged at fixed spaces along a circular arc with substantially the same radius about the rocking center, while one hole 114 on the first plate 44 is located correspondingly to one hole 115 on the second plate 46 so as to form a pair. As may be seen from the figure, the centers of the respective paired upper and lower holes 114 and 115 offset differently by degrees. Accordingly, if a suitable bar with a diameter slightly smaller than the aperture is thrusted in between an optional pair of holes and wrenched from side to side, the two plate 44 and 46 will be rocked relatively until the centers of such upper and lower holes are brought into line with each other, thereby changing the angle R formed by the pin 45 and the pin 47 about the rocking center. The stagger of the centers of the upper and lower holes is equal to the angular variation of the two plates 44 and 46. Therefore, in order to obtain the desired angular variation the aforesaid bar should be thrusted in between the holes 114 and 115 with a stagger equivalent to such angular variation. That is, a series of these holes form a relative angle control means.

Figure 15:
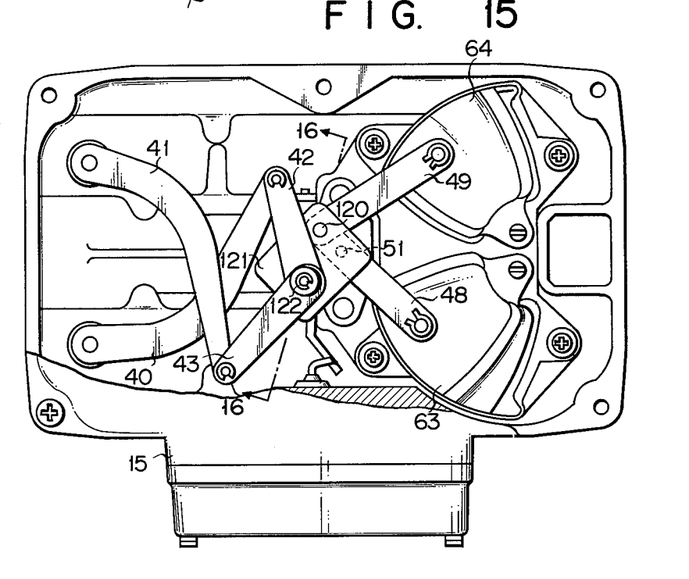
FIG. 15 is a top view corresponding to FIG. 1 illustrative of a further additional modified example of the crank mechanism.
Figure 17:
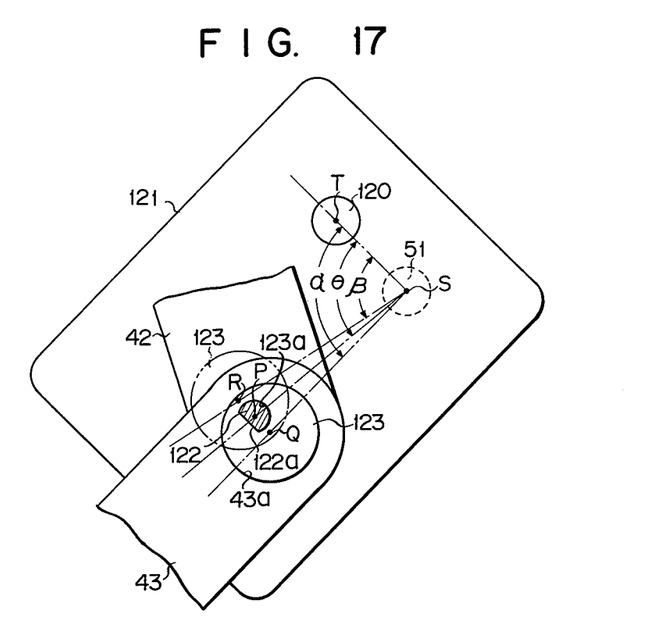
FIG. 17 is a plan as taken along 17—17 line of FIG. 16.

In a further additional modified example as illustrated in FIGS. 15 and 17, each free end of the diaphragm movement transmission levers 40 and 41 pivotally mounts each one end of another pair of diaphragm movement transmission levers 42 and 43. The other ends of the levers 42 and 43 are coupled to the crank mechanism as described below.

On the gas meter body 16 is mounted the upper case 15 with the valve cage, the valve cage containing a pair of distributing valves with the respective valve members 63 and 64. On each valve member is pivotally mounted each one end of the valve actuating levers 48 and 49. The other ends of the levers 48 and 49 are coupled to the crank mechanism as described below.

Figure 16:
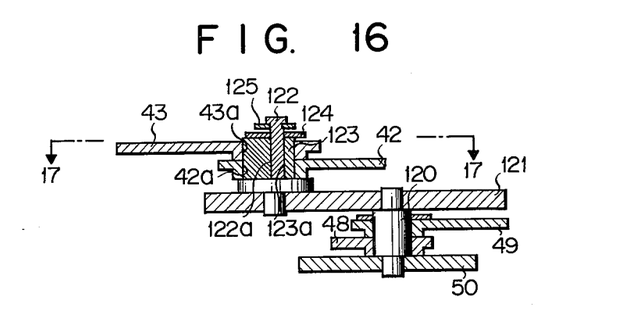
FIG. 16 is an enlarged partial sectional view as taken along line 16—16 of FIG. 15.

In the crank mechanism operatively coupling the diaphragm movement transmission levers 42 and 43 and the valve actuating levers 48 and 49, the crank lever 50 is fixed to the upper end of the crank shaft 51, while the lower end of a spindle 120 is fixed to the lever 50. The upper end of the spindle 120 is fixed to a crank plate in a horizontal position. Thus, the crank plate 121 is to rotate in a body with the crank lever 50 around the crank shaft 51 accompanying the rotation thereof. On the spindle 120 is rockably mounted the valve actuating levers 48 and 49 in layers. These valve actuating levers 48 and 49 are directly put on the spindle 120. Such direct mounting may also involve the pivotal mounting on the spindle 120 through a bush or the like for general use.

To the crank plate 121 is fixed a spindle 122 in a position different from the fixing position of the spindle 120. This spindle 122 is to mount the diaphragm movement transmission levers 42 and 43, while, in this modified exmaple, the levers 42 and 43 are attached indirectly to the spindle 122 through an eccentric 123 as shown in the figures.

There will be given a detailed description of the construction of the eccentric portion hereinafter. On the spindle 122 is axially formed a notched surface 122a as illustrated sectionally in FIG. 17 for preventing rotation of the eccentric 123. Meanwhile, the eccentric 123 is provided with a fitting pole 123a in compliance with the sectional configuration of the spindle 122 formed axially through the eccentric 123 at the eccentric position. The eccentric 123 is put axially on the spindle 122 together with a washer 124, and thereafter a retaining ring 125 is also put on the spindle 122. Thus, the fitting hole 123a is engaged closely with the spindle 122, and the eccentric 123 may be retained detachably but not rotatably. At the end portions of the diaphragm movement transmission levers 42 and 43 are formed openings 42a and 43a corresponding to the outline of the eccentric 123. The eccentric 123 is engaged rockably with the openings 42a and 43a, thereby attaching the two levers 42 and 43 indirectly to the spindle 122.

Thus, the diaphragm movement transmission levers 42 and 43 are swinged accompanying the reciprocation of the measuring diaphragm (not shown) by gas pressure, while the crank plate 121 is rotated continuously around the crank shaft 51. The rotation of the crank plate 121 swings the valve actuating levers 48 and 49 and reciprocates the pair of valve members 63 and 64 in different phases, thereby accomplishing switching operation of the distributing valve. In doing this, the switching operation of the distributing valve should be performed with a fixed phase angle or angle of advance before the measuring diaphragm reaches the stroke end. Accordingly, the angle formed by the pivotal point of the diaphragm movement transmission levers 42 and 43 on the crank plate 121 and the pivotal point of the valve actuating levers 48 and 49 on the crank plate 121 about the crank shaft should be set at a correct angle. The eccentric is employed in order to set such angle. By use of the eccentric, the angle $\theta$ prior to adjustment formed by the centers P and T of the spindles 122 and 120 about the center S of the crank shaft may be adjusted at an angle of $\alpha$. The angle $\alpha$ is an angle formed by the center Q of the eccentric 123 and the center T of the spindle 120 about the center S of the crank shaft. Further, the center Q of the eccentric 123 is nothing but the pivotal point of the diaphragm movement transmission levers 42 and 43, while the center T of the spindle 120 is the pivotal point of the valve actuating levers 48 and 49, so that there may be provided a gas meter with a properly adjusted angle of advance.

Meanwhile, gas meters of different models or specifications may have different angles of advance. For example, if an angle β formed by the two pivotal points about the crank shaft is a properly adjusted angle to provide a correct angle of advance, as indicated by the chain line in FIG. 17, another eccentric, with the same outside diameter in a different eccentric position with a center R to form the angle β should, at assembly, be put on the spindle 122, engaging the diaphragm movement transmission levers 42 and 43 with such eccentric.

Accordingly, if you provide suitably for eccentrics with the same outside diameter and different eccentric positions for the respective models or specifications of gas meters, you will be able to manage with a single identical part as for each of other components.

Although, in this modified example, the eccentric is put on the spindle for the diaphragm movement transmission levers, it may alternatively be put on the spindle for the valve actuating levers. In this case, the diaphragm movement transmission levers are to be attached directly to the spindle.

Furthermore, the rotation stop means for preventing the eccentric from rotating relatively to the spindle may otherwise be composed of e.g. a key and a key way, not limited to this modified example.

Thus, according to this modified example, common parts may be used with different models or specifications of gas meters by suitably selecting eccentrics alone for use at assembly of gas meters. Accordingly, by such common use of the parts, the production cost of a gas meter may be reduced.

What we claim is:

1. A diaphragm type gas meter comprising:
a counter section for visually indicating a quantity of gas delivered through the meter;
a valve cage formed within an upper casing;
measuring chambers formed within a lower casing, said lower casing having a gas discharge passage;
a gas inlet port formed on said upper casing and opening into said valve cage;
a distributing valve means provided with said valve cage and including valve members and a plurality of valve chambers;
a gas outlet port formed on said upper casing and opening into one of discharge-side valve members of said distributing valve means through said discharge passage of said lower casing;
a crank mechanism provided within said valve cage and including a crank shaft coupled to said counter section;
valve actuating levers connected to said valve members;
diaphragm movement transmission levers coupled operatively by said crank mechanism, said diaphragm movement transmission levers protruding from said valve cage into said measuring chamber, the protruding bottom ends of said levers being supported by blade shafts rotatably supported by bearings;
rockable blades fixed to said blade shafts for supporting measuring diaphragms defining said measuring chambers;
diaphragm control wall means provided within said measuring chambers and having diaphragm control surfaces for restricting stroke ends of reciprocation of said measuring diaphragms, said valve members reciprocating through fixed strokes according to the reciprocation of said measuring diaphragms by gas pressure;
a gas introduced into said gas meter through said inlet port being discharged successively through said outlet port, said quantity of the gas flowed being integrated and indicated by said counter;
said crank mechanism having a first crank plate pivotally mounting said diaphragm movement transmission levers and a second crank plate underlying said first plate and pivotally mounting said valve actuating levers;
a supporting means comprising a projection on one of the first and second crank plates and a hole in the other of the first and second crank plates for allowing the projection to fit therein;
a control means for controlling the relative rocking angle of both said plates to adjust the angle of advance of the gas meter;
a fixing means for fixing said plates to each other so as to rotate said plates as a body around said rocking center; and
a means for bringing said rocking center of both said plates in line with the central axis of said crank shaft.

2. A diaphragm type gas meter according to claim 1, wherein said relative rocking angle control means includes a rotating member supported by one crank plate, an eccentric cam supported by said rotating member, and a cam slot formed in the other crank plate and engaged with said eccentric cam.

3. A diaphragm type gas meter according to claim 1, wherein said relative rocking angle control means includes a single lug formed integrally on the edge of one crank plate and a pair of lugs formed on the edge of the other crank plate so as to sandwich said single lug therebetween.

4. A diaphragm type gas meter according to claim 1, wherein said relative rocking angle control means includes a plurality of perforations formed in a line on one crank plate and a plurality of perforations formed in a line on the other crank plate correspondingly to said perforations, respectively, said perforations being so arranged that the deviation of the center of each perforation on one crank plate from the center of each corresponding perforation on the other crank plate varies successively with each pair of perforations.

5. A diaphragm type gas meter according to claim 1, comprising a die-cast partition wall with a triangular section mounted flush with the top surface of said lower casing and defining said discharge-side valve chamber and discharge passage, said die-cast partition wall being integral with the lower casing.

6. A diaphragm type gas meter according to claim 1, comprising a scale for visually indicating said relative rocking angles of both said crank plates marked on one of said crank plates.

7. A diaphragm type gas meter according to claim 1, wherein each of said diaphragm control wall means comprises a circular diaphragm control plate arranged along the periphery of each said measuring diaphragm, and a mooring strip formed integrally on said diaphragm control plate above each said rockable blade protruding from the periphery of said diaphragm control plate so as to cover the rocking range of said rockable blade, said mooring strip hitting against the upper edge of said rockable blade, thereby preventing each said blade shaft from coming off the bearing.

8. A diaphragm type gas meter according to claim 1, wherein said diaphragm control surfaces of each of said diaphragm control wall means, when each said measuring diaphragm is located at each said stroke end, includes a first circular inclined surface portion in intensive contact with said diaphragm and a second circular inclined surface portion extending adjacent to said first inclined surface portion and formed bent at a fixed angle to said first portion, a portion of said measuring diaphragm corresponding to said second inclined surface portion being shiftable further outward even after said contact between the first inclined surface and the measuring diaphragm.

9. A diaphragm type gas meter comprising:
a counter section for visually indicating a quantity of gas delivered through the meter;
a valve cage formed within an upper casing;
measuring chambers formed within a lower case, said lower casing having a gas discharge passage;
a gas inlet port formed on said upper casing and opening into said valve cage;
a distributing valve means provided with said valve cage and including valve members and a plurality of valve chambers;
a gas outlet port formed on said upper casing and opening into one of discharge-side valve members of said distributing valve means through said discharge passage of said lower casing;
a crank mechanism provided within said valve cage and including a crank shaft coupled to said counter section;
valve actuating levers connected to said valve members;
diaphragm movement transmission levers coupled operatively by said crank mechanism, said diaphragm movement transmission levers protruding from said valve cage into said measuring chamber, the protruding bottom ends of said levers being supported by blade shafts rotatably supported by bearings;
rockable blades fixed to said blade shafts for supporting measuring diaphragms defining said measuring chambers;
diaphragm control wall means provided within said measuring chambers and having diaphragm control surfaces for restricting stroke ends of reciprocation of said measuring diaphragms, said valve members reciprocating through fixed strokes according to the reciprocation of said measuring diaphragms by gas pressure;
a gas introduced into said gas meter through said inlet port being discharged successively through said outlet port, said quantity of the gas flowed being integrated and indicated by said counter;
said crank mechanism having a first crank plate pivotally mounting said diaphragm movement transmission levers and a second crank plate underlying said first plate and pivotally mounting said valve actuating levers;
a control means for controlling the relative rocking angle of both said plates to adjust the angle of advance of the gas meter, said relative rocking angle control means including a rotating member supported by one crank plate, an eccentric cam supported by said rotating member, and a cam slot formed in the other crank plate and engaged with said eccentric cam;
a fixing means for fixing said plates to each other so as to rotate said plates as a body around said rocking center; and
a means for bringing said rocking center of both said plates in line with the central axis of said crank shaft.

10. A diaphragm type gas meter comprising:
a counter section for visually indicating a quantity of gas delivered through the meter;
a valve cage formed within an upper casing;
measuring chambers formed within a lower case, said lower casing having a gas discharge passage;
a gas inlet port formed on said upper casing and opening into said valve cage;
a distributing valve means provided with said valve cage and including valve members and a plurality of valve chambers;
a gas outlet port formed on said upper casing and opening into one of discharge-side valve members of said distributing valve means through said discharge passage of said lower casing;
a crank mechanism provided within said valve cage and including a crank shaft coupled to said counter section;
valve actuating levers connected to said valve members;
diaphragm movement transmission levers coupled operatively by said crank mechanism, said diaphragm movement transmission levers protruding from said valve cage into said measuring chamber, the protruding bottom ends of said levers being supported by blade shafts rotatably supported by bearings;
rockable blades fixed to said blade shafts for supporting measuring diaphragms defining said measuring chambers;
diaphragm control wall means provided within said measuring chambers and having diaphragm control surfaces for restricting stroke ends of reciprocation of said measuring diaphragms, said valve members reciprocating through fixed strokes according to the reciprocation of said measuring diaphragms by gas pressure;
a gas introduced into said gas meter through said inlet port being discharged successively through said outlet port, said quantity of the gas flowed being integrated and indicated by said counter;
said crank mechanism having a first crank plate pivotally mounting said diaphragm movement transmission levers and a second crank plate underlying said first plate and pivotally mounting said valve actuating levers;
a control means for controlling the relative rocking angle of both said plates to adjust the angle of advance of the gas meter, said relative rocking angle control means including a single lug formed integrally on the edge of one crank plate and a pair of lugs formed on the edge of the other crank plate so as to sandwich said single lug therebetween;
a fixing means for fixing said plates to each other so as to rotate said plates as a body around said rocking center; and
a means for bringing said rocking center of both said plates in line with the central axis of said crank shaft.

11. A diaphragm type gas meter comprising:

a counter section for visually indicating a quantity of gas delivered through the meter;

a valve cage formed within an upper casing;

measuring chambers formed within a lower casing, said lower casing having a gas discharge passage;

a gas inlet port formed on said upper casing and opening into said valve cage;

a distributing valve means provided with said valve cage and including valve members and a plurality of valve chambers;

a gas outlet port formed on said upper casing and opening into one of discharge-side valve members of said distributing valve means through said discharge passage of said lower casing;

a crank mechanism provided within said valve cage and including a crank shaft coupled to said counter section;

valve actuating levers connected to said valve members;

diaphragm movement transmission levers coupled operatively by said crank mechanism, said diaphragm movement transmission levers protruding from said valve cage into said measuring chamber, the protruding bottom ends of said levers being supported by blade shafts rotatably supported by bearings;

rockable blades fixed to said blade shafts for supporting measuring diaphragms defining said measuring chambers;

diaphragm control wall means provided within said measuring chambers and having diaphragm control surfaces for restricting stroke ends of reciprocation of said measuring diaphragms, said valve members reciprocating through fixed strokes according to the recriprocation of said measuring diaphragms by gas pressure;

a gas introduced into said gas meter through said inlet port being discharged successively through said outlet port, said quantity of the gas flowed being integrated and indicated by said counter;

said crank mechanism having a first crank plate pivotally mounting said diaphragm movement transmission levers and a second crank plate underlying said first plate and pivotally mounting said valve actuating levers;

a control means for controlling the relative rocking angle of both said plates to adjust the angle of advance of the gas meter, said relative rocking angle control means including a plurality of perforations formed in a line on one crank plate and a plurality of perforations formed in a line on the other crank plate correspondingly to said perforations, respectively, said perforations being so arranged that the deviation of the center of each perforation on one crank plate from the center of each corresponding perforation on the other crank plate varies successively with each pair of perforations;

a fixing means for fixing said plates to each other so as to rotate said plates as a body around said rocking center; and a means for bringing said rocking center of both said plates in line with the central axis of said crank shaft.

12. A diaphragm type gas meter comprising:

a counter section for visually indicating a quantity of gas delivered through the meter;

a valve cage formed within an upper casing;

measuring chambers formed within a lower casing, said lower casing having a gas discharge passage;

a gas inlet port formed on said upper casing and opening into said valve cage;

a distributing valve means provided with said valve cage and including valve members and a plurality of valve chambers;

a gas outlet port formed on said upper casing and opening into one of discharge-side valve members of said distributing valve means through said discharge passage of said lower casing;

a crank mechanism provided within said valve cage and including a crank shaft coupled to said counter section;

valve actuating levers connected to said valve members;

diaphragm movement transmission levers coupled operatively by said crank mechanism, said diaphragm movement transmission levers protruding from said valve cage into said measuring chamber, the protruding bottom ends of said levers being supported by blade shafts rotatably supported by bearings;

rockable blades fixed to said blade shafts for supporting measuring diaphragms defining said measuring chambers;

diaphragm control wall means provided within said measuring chambers and having diaphragm control surfaces for restricting stroke ends of reciprocation of said measuring diaphragms, said valve members reciprocating through fixed strokes according to the recriprocation of said measuring diaphragms by gas pressure;

each of said diaphragm control wall means including a circular diaphragm control plate arranged along the periphery of each said measuring diaphragm, and a mooring strip formed integrally on said circular diaphragm control plate above each said rockable blade protruding from the periphery of said circular diaphragm control plate so as to cover the rocking range of said rockable blade, said mooring strip hitting against the upper edge of said rockable blade, thereby preventing each said blade shaft from coming off its bearing;

a gas introduced into said gas meter through said inlet port being discharged successively through said outlet port, said quantity of the gas flowed being integrated and indicated by said counter;

said crank mechanism having a first crank plate pivotally mounting said diaphragm movement transmission levers and a second crank plate underlying said first plate and pivotally mounting said valve actuating levers;

a control means for controlling the relative rocking angle of both said plates to adjust the angle of advance of the gas meter;

a fixing means for fixing said plates to each other so as to rotate said plates as a body around said rocking center; and a means for bringing said rocking center of both said plates in line with the central axis of said crank shaft.

13. A diaphragm type gas meter comprising:

a counter section for visually indicating a quantity of gas delivered through the meter;

a valve cage formed within an upper casing;

measuring chambers formed within a lower casing, said lower casing having a gas discharge passage;

a gas inlet port formed on said upper casing and opening into said valve cage;

a distributing valve means provided with said valve cage and including valve members and a plurality of valve chambers;

a gas outlet port formed on said upper casing and opening into one of discharge-side valve members of said distributing valve means through said discharge passage of said lower casing;

a crank mechanism provided within said valve cage and including a crank shaft coupled to said counter section;

valve actuating levers connected to said valve members;

diaphragm movement transmission levers coupled operatively by said crank mechanism, said diaphragm movement transmission levers protruding from said valve cage into said measuring chamber, the protruding bottom ends of said levers being supported by blade shafts rotatably supported by bearings;

rockable blades fixed to said blade shafts for supporting measuring diaphragms defining said measuring chambers;

diaphragm control wall means provided within said measuring chambers and having diaphragm control surfaces for restricting stroke ends of reciprocation of said measuring diaphragms, said valve members reciprocating through fixed strokes according to the recriprocation of said measuring diaphragms by gas pressure;

said diaphragm control surfaces of each of said diaphragm control wall means, when each said measuring diaphragm is located at each said stroke end, including a first circular inclined surface portion in intensive contact with said diaphragm and a second circular inclined surface portion extending adjacent to said first inclined surface portion and formed bent at a fixed angle to said first portion, a portion of said measuring diaphragm corresponding to said second inclined surface portion being shiftable further outward even after said contact between the first inclined surface and the measuring diaphragm;

a gas introduced into said gas meter through said inlet port being discharged successively through said outlet port, said quantity of the gas flowed being integrated and indicated by said counter;

said crank mechanism having a first crank plate pivotally mounting said diaphragm movement transmission levers and a second crank plate underlying said first plate and pivotally mounting said valve actuating levers;

a control means for controlling the relative rocking angle of both said plates to adjust the angle of advance of the gas meter; p1 a fixing means for fixing said plates to each other so as to rotate said plates as a body around said rocking center; and a means for bringing said rocking center of both said plates in line with the central axis of said crank shaft.

* * * * *